United States Patent
Skiba et al.

(10) Patent No.: US 10,421,897 B2
(45) Date of Patent: Sep. 24, 2019

(54) METHOD OF TREATING A WELL WITH THE FORMATION OF PROPPANT STRUCTURES (VARIANTS)

(71) Applicant: SCHLUMBERGER TECHNOLOGY CORPORATION, Sugar Land, TX (US)

(72) Inventors: Sergey Sergeevich Skiba, Novosibirsk (RU); Kira Vladimirovna Yudina, Novosibirsk (RU); Maxim Pavlovich Yutkin, Novosibirsk (RU); Bernhard Rudolf Lungwitz, Würzburg (DE); Andrey Vladimirovich Yakovlev, Volgograd (RU); Mohan Kanaka Raju Panga, Sugar Land, TX (US); Konstantin Viktorovich Vidma, Novosibirsk (RU); Alexey Vladimirovich Alekseev, Novosibirsk (RU); Chad Kraemer, Katy, TX (US); Geza Horvath Szabo, Edmonton (CA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/780,152

(22) PCT Filed: Nov. 30, 2015

(86) PCT No.: PCT/RU2015/000830
§ 371 (c)(1),
(2) Date: May 30, 2018

(87) PCT Pub. No.: WO2017/095253
PCT Pub. Date: Jun. 8, 2017

(65) Prior Publication Data
US 2018/0362838 A1  Dec. 20, 2018

(51) Int. Cl.
*E21B 43/267* (2006.01)
*E21B 43/04* (2006.01)
(Continued)

(52) U.S. Cl.
CPC .............. *C09K 8/685* (2013.01); *C09K 8/665* (2013.01); *C09K 8/80* (2013.01); *C09K 8/887* (2013.01); *E21B 43/267* (2013.01)

(58) Field of Classification Search
CPC ...... E21B 43/267; E21B 43/26; E21B 43/261; E21B 43/247; C09K 8/68; C09K 8/805; C09K 8/80; C09K 8/685; C09K 8/62
See application file for complete search history.

(56) References Cited

U.S. PATENT DOCUMENTS

| 7,708,069 B2 | 5/2010 | Watters et al. |
| 7,781,380 B2 | 8/2010 | Lin et al. |

(Continued)

FOREIGN PATENT DOCUMENTS

| WO | 2006077558 A1 | 7/2006 |
| WO | 2009009886 A1 | 1/2009 |

(Continued)

OTHER PUBLICATIONS

Doctor et al., "Use of Channel Fracturing Technology Increases Producetion and Reduces Risks in Horizontal Wellbore Completions. First Experience in Russia, South-Priobskoe Oil Field", SPE 171221, SPE Russian Oil and Gas Exploration and Production Conference and Exhibition, Oct. 14-16, 2014, 14 pages.

*Primary Examiner* — Zakiya W Bates

(57) ABSTRACT

This method is designed to facilitate the well treatment with the possibilities for non-uniform/heterogeneous proppant placement in the extended and branched fractures produced by hydraulic fracturing.
The essence of the method is to inject a proppant-bearing gel into the wellbore drilled into a productive formation. The (Continued)

low-viscosity fracturing fluid is injected into the wellbore together with the gel fluid (simultaneously or in turns). The method also provides for the injection of gas into the proppant-bearing gel and/or the low-viscosity fluid. The gas can be injected upstream of the junction point, at the junction point, or downstream of the junction point of the flows of the proppant-bearing gel and the low-viscosity fluid. The method further provides for the division of the gel fluid into the separate agglomerates with their subsequent injection into the fractures in the subterranean formation to form the proppant structures in the fracture.

19 Claims, 5 Drawing Sheets

(51) Int. Cl.
*C09K 8/68* (2006.01)
*C09K 8/80* (2006.01)
*C09K 8/88* (2006.01)
*C09K 8/66* (2006.01)

(56) References Cited

U.S. PATENT DOCUMENTS

| | | | |
|---|---|---|---|
| 7,932,214 | B2 | 4/2011 | Zamora et al. |
| 8,042,614 | B2 | 10/2011 | Sullivan et al. |
| 8,448,706 | B2 | 5/2013 | Hughes et al. |
| 8,839,865 | B2 | 9/2014 | Willberg et al. |
| 2010/0252262 | A1 | 10/2010 | Ekstrand et al. |
| 2012/0048547 | A1 | 3/2012 | Hughes et al. |
| 2012/0048554 | A1 | 3/2012 | Hughes et al. |
| 2012/0048557 | A1 | 3/2012 | Hughes et al. |
| 2013/0237461 | A1 | 9/2013 | Hughes et al. |
| 2014/0060827 | A1 | 3/2014 | Nguyen et al. |

FOREIGN PATENT DOCUMENTS

| | | |
|---|---|---|
| WO | 2011136678 A1 | 11/2011 |
| WO | 2015108438 A1 | 7/2015 |

METHOD OF TREATING A WELL WITH THE FORMATION OF PROPPANT STRUCTURES (VARIANTS)

FIELD OF THE DISCLOSURE

This disclosure generally relates to the oil and gas industry and, in particular, to methods of stimulating oil and/or gas inflow from the wellbore and, more specifically, to methods of heterogeneous placement of a proppant to extended fractures and complex fractures network fractures in subterranean formations.

BACKGROUND

Hydraulic fracturing of a subterranean formation is a fluid inflow stimulation technique wherein the fractures are artificially created in the subterranean formation of the field. The fractures are created by injecting the fracturing fluid with a pressure exceeding the fracturing pressure of the formation. The injected fluid bears a proppant (a propping agent) which is delivered into the fracture to prevent closing the fracture when the pressure is released upon completion of the inflow stimulation. An approach widely used for hydraulic fracturing is based on using high-viscosity fluids, such as cross-linked gels, as carrier fluids to transport the proppant from the surface through the wellbore and into the fractures formed in the course of hydraulic fracturing. The high viscosity fluid reduces the settling rate of the proppant particles resulting in a higher portion of the injected proppant being delivered to the intended location within the fractures, thus ensuring transportation of the particles and low rate of their settlement. But the use of this technology is limited, first of all, due to viscous fluids' inability to form a highly branched network of fractures in the formation. Hydraulic fracturing based on a low-viscosity fracturing fluid, for example, a friction-reducing aqueous polymer solution, is currently used more often in tight formations, such as shales or tight sands. Low viscosity of the fracturing fluid and/or high rate of its injection result in the formation of a highly branched network of fractures; however, the use of the low-viscosity fluids for hydraulic fracturing causes difficulties in preventing the proppant particles from settling due to poor transport properties of the carrier fluids. After the fracture closure, incomplete vertical covering of the fracture with the proppant is observed that is caused by the proppant settling. Existing techniques also present challenges in delivering the proppant into the secondary and tertiary (narrow) fractures of the complex fracture networks.

Patent application US20100252262 describes a method that includes fracturing fluid being injected into a formation under a pressure sufficient to create a fracture in the formation, wherein the fluid includes a proppant and gas to reduce the proppant settling rate. A composition that includes a proppant and microbubbles of gas in the amount (1 to 20% vol.) sufficient to reduce the proppant settling rate.

Patent application US20140060827 discloses an hydraulic fracturing method which includes blending the hydraulic fracturing fluid: carrier fluid with a predetermined density, proppant agglomerates with a density higher than the carrier fluid density, an additive of light particles (with a density lower than the carrier fluid density) and subsequent placement of the resultant hydraulic fracturing fluid into the fracture, wherein these light particles will slow down the proppant settling in the fracture. The proppant agglomerates are formed when the proppant particles mix with a consolidating (adhesive) agent.

A fluid composition with the injected gas (that is a foam) used for hydraulic fracturing is described in U.S. Pat. No. 7,932,214, wherein a composition based on an ionically coupled gel-like system is used as a viscous phase, which reduces the water consumption for the hydraulic fracturing operation. The "ionically coupled gel" claimed in U.S. Pat. No. 7,932,214 means a gel formed by the interaction between a charged polymer (polymeric electrolyte) and an oppositely charged surfactant. Such dense gel formed by the interaction between oppositely charged molecules (a charged polymer and a charged surfactant) possesses a high stability under downhole conditions. In the presence of foam stabilisers and lower alcohols such foamed composition demonstrates an increased viscosity and high stability of the foam, which allows the use of the described foamed gel system as a hydraulic fracturing fluid.

The analysis of the prior art has shown that there is a demand for an improved method of non-uniform/heterogeneous proppant placement in the extended and branched hydraulic fractures, which increases the fracture permeability compared to the conventional homogeneous proppant placement.

The description discloses a new approach to creating the proppant-bearing agglomerates (or proppant agglomerates) that are stable/strong during transportation through the wellbore and into the hydraulic fractures due to reduced losses of the proppant under shear loads to form the proppant structures that prevent fractures from closing. At the same time, due to the improved buoyancy of the agglomerates, which in turn is increased by improved carrying capability of the hydraulic fracturing fluids, their transfer and vertical placement of the proppant structures are improved. Moreover, the proposed technology reduces the hydraulic fracturing environmental effects due to the reduced amount of the carrier fluid to deliver the proppant into the fracture to the same depth.

SUMMARY

Generally the method designed to facilitate the well treatment with the possibilities for non-uniform/heterogeneous proppant placement in the extended and branched fractures produced by hydraulic fracturing is provided.

The essence of the method is to inject a proppant-bearing gel into the wellbore drilled into a productive formation of an underground deposit. The low-viscosity fracturing fluid is injected into the wellbore along with the gel (simultaneously or alternately). The method also provides for the injection of gas into the proppant-bearing gel and/or the low-viscosity fluid. The gas can be injected upstream of the junction point, at the junction point, or downstream of the junction point of the flows of the proppant-bearing gel and the low-viscosity fluid. The method further provides for the division of the gel into the separate agglomerates with their subsequent injection into the fractures in the subterranean formation to form the proppant structures in the fracture.

However, multiple modifications of the method are possible that marginal changes from the description given above. Accordingly, such modifications should be included in the scope of the disclosure as defined in the claims.

BRIEF DESCRIPTION OF THE DRAWINGS

Certain embodiments of the disclosure will be described hereinafter with the reference to the accompanying drawings, wherein like reference numerals denote like elements. However, it should be appreciated that the accompanying drawings illustrate various embodiments of the disclosure described herein and are not meant to limit the scope of various technologies described herein.

DETAILED DESCRIPTION

Figure 1:
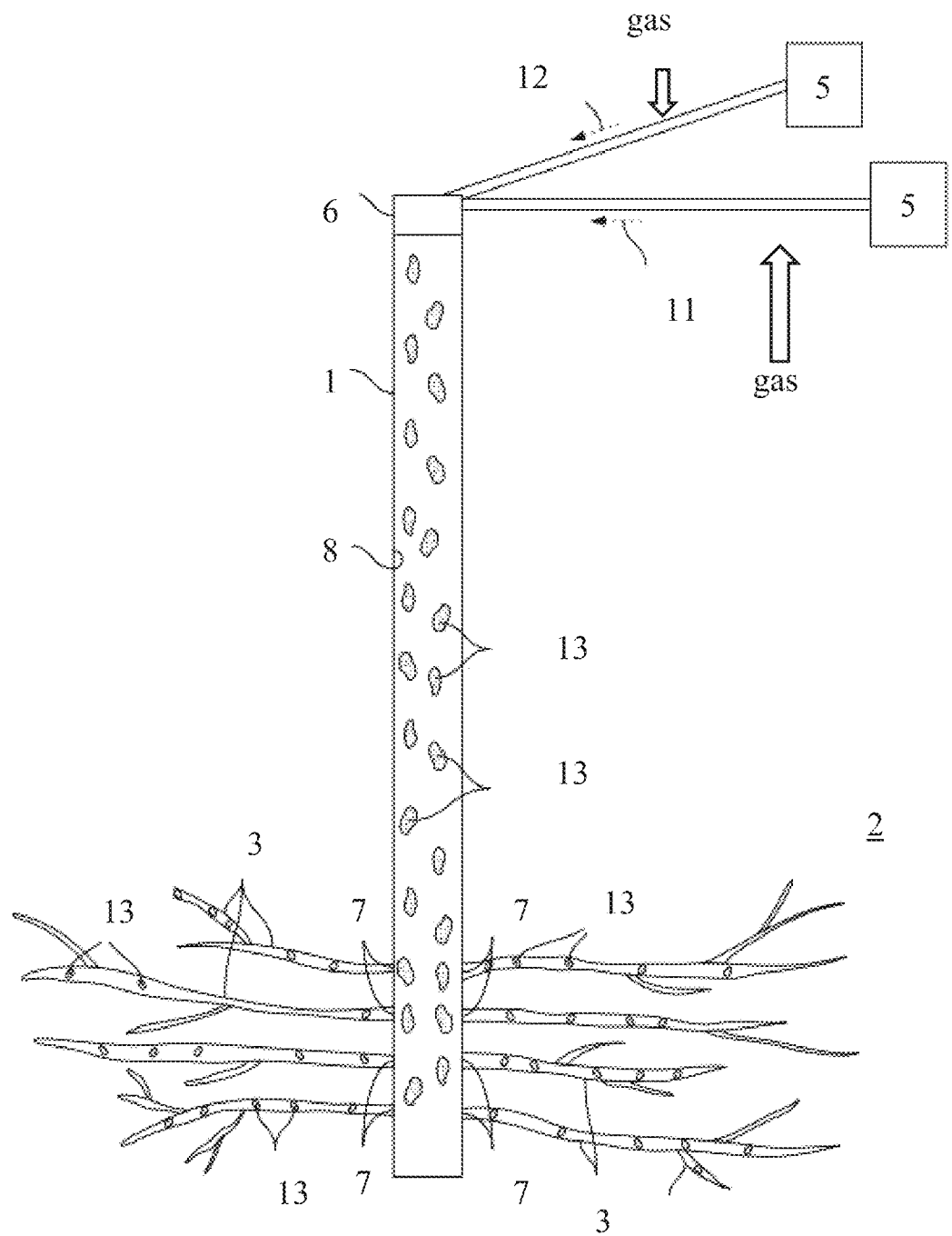
FIG. 1 shows schematically the system of well stimulation treatment according to the embodiments: injection into the well of the low-viscosity fluid, the proppant-bearing cross-linked gel, and gas into one or both injection lines upstream of the flow junction point.

In the following description, numerous details are set forth to provide an understanding of some embodiments of this disclosure. It will be understood by those of ordinary skill in the art that the system and/or method may be practised without these details and that numerous variations or modifications of the described embodiments may be possible.

In general, this disclosure relates to a method or a system for performing well treatment. A gel with the proppant is injected into the wellbore extending into the subterranean formation. Additionally, a clean fluid, for example, a low-viscosity fluid, is injected into the wellbore. The low-viscosity fluid and the gel can be injected simultaneously or alternately (in turns). Moreover, gas is injected into the proppant-bearing gel, or the low-viscosity fluid, or into both of them. In some embodiments, during the injection of the gel and low-viscosity fluid, a cross-linking agent is regularly added to the flow to obtain slugs (pulses) based on the cross-linked gel.

During the hydraulic fracturing, fluids of various densities and various viscosities are used. Within the context of this disclosure, the term "proppant fluid" ("proppant-laden slurry", "viscous fluid", or "dirty" fluid) is used. The term "proppant fluid" implies the presence of a proppant (or a propping agent), for example, sand suspended in the fluid, e.g., a gel. Within this disclosure, the term "clean fluid" (or "low-viscosity fluid", or "clean" fluid) is also used to designate a fluid that does not contain a proppant (the proppant particles). At the same time, it is not actually "clean", because some additives of other types may be added to the fluid, such as chemical agents, activators, friction-reducing polymers, fibres, etc. The proppant fluid, for example, a gel having properties that differ from the properties of the low-viscosity fluid, is immiscible with the low-viscosity fluid during a certain period of time, for example, due to the cross-linked polymeric structure of the proppant fluid, differences in the fluid viscosity, hydrophobic/hydrophilic properties, emulsion formation, flow stress, and/or other properties. When the fluids with different rheological properties are injected into the well, they are injected in slugs, or "pulses" (for example, see publication SPE-171221-RU).

Under downhole conditions, besides the proppant and low-viscosity fluids, additional additives are used, for example, fibres, plastic balls and hollow spheres, surfactants, bactericides, clay stabilisers, additives for improving the gel stability at high temperatures, etc.

During the well treatment, the proppant fluid, for example, a gel with proppant, is separated into the proppant agglomerates, which are injected together with the low-viscosity fluid under pressure into the fractures, which in turn lead them to the subterranean formation. The settling rate of the proppant agglomerates in the low-viscosity fluid medium is known to depend on the specific weight of the agglomerate and the effective viscosity and density of the surrounding fluid.

Within this disclosure, the gas is injected upstream of the junction point of the proppant and low-viscosity fluid flows, or at the junction point of the flows, or downstream of the junction point. The junction (mixing) point of flows can be regarded as a zone of a certain extent, e.g. a wellhead, or a pipe section. When the gas is injected into the proppant fluid, the specific density of the resulting foamed fluid or foamed gel decreases. The "foamed fluid" or "foamed gel" means that this gel or this fluid contains gas bubbles under downhole conditions.

The presence of the gas and the proppant fluid, wherein the gas acts as an agent controlling the proppant agglomerate buoyancy, ensures better proppant placement along the length of the hydraulic fracture because of the reduced specific weight of the proppant agglomerates compared to the proppant particles (see Examples 1, 2).

At the same time, when the gas is injected into the low-viscosity fluid, gas bubbles increase the effective viscosity of this low-viscosity fluid, which in turn improves the proppant placement along the fracture height because of rising gas bubbles, which push proppant agglomerates upwards and/or form gas "cushions" that support the proppant agglomerates, which prevents them from settling in the low-viscosity fluid. In some embodiments, it is possible to control the fracture height increase, because the net pressure can be reduced compared to the conventional hydraulic fracturing treatments that use water with a friction-reducing agent ("water frac") and/or compared to the treatment based on the cross-linked gel (because a less viscous fluid is used).

The proppant agglomerates are immiscible with the low-viscosity fluid because of their high viscosity, and these proppant agglomerates along with the low-viscosity fluid are injected into the hydraulic fracture through the casing perforations. When the proppant agglomerates pass through the perforations they are exposed to shear stress and are therefore broken into the smaller proppant agglomerates (or pulses of gel, or slugs), which are further carried deep into the fracture or the branched network of fractures. Within this disclosure, the proppant agglomerate stability means that when it is transferred into the fracture by the hydraulic fracturing flow, the main agglomerate components are preserved, for example, the proppant suspended in the gel and bubbles of the injected gas. Such stability is reflected in the constant specific weight of the proppant agglomerate.

The gas can be added to both the low-viscosity fluid and the viscous fluid so as to achieve a combination of the above effects. The injected gas is selected from the following gases, such as, for example, nitrogen, air, natural gas, carbon dioxide, methane, ethane, propane, inert gases or any blend thereof.

The gel-based proppant agglomerates with inclusions of gas bubbles have a reduced density, which decreases the settling rate of such agglomerates in the fracture, which in turn ensures their more even (uniform) placement along the fracture height. The free space around the proppant agglomerates is filled with gas "cushions" formed in the low-viscosity fluid, which improves the formation of the channels with the high conductivity of the fluid flow along the fracture produced as a result of hydraulic fracturing. This configuration of placement of the proppant structures (or "islets", or "proppant pillars") in the fracture is known in practice as a result of using the technology of a "heterogeneous proppant placement", or "channel hydraulic fracturing". In some embodiments, the gel may be divided into the small proppant agglomerates directly inside the well. The place inside the well is determined as a location downstream of the high-pressure pumps for hydraulic fracturing (the pumps are used to inject the low-viscosity fluid and gelled fluid into the well).

In some embodiments, the well treatment comprises injecting a cross-linked gel containing a proppant into a wellbore extending into a subterranean formation. A low-viscosity fluid is also injected into the wellbore either simultaneously or alternately (in turns) from the cross-linked gel. The low-viscosity fluid and the cross-linked gel can be injected alternately in slugs, beginning with any of the two types of fluid. Such a process can be repeated and various volumes of the slugs may be used. In some embodiments, the flow of the cross-linked gel is broken into the proppant agglomerates inside the well.

A proppant fluid, e.g., a cross-linked gel, and a low-viscosity fluid differ substantially from each other under downhole conditions in terms of their viscosity, which allows the co-existence of these two fluids in the form of two immiscible phases. The difference in the rheology of the cross-linked gel and the low-viscosity fluid (tentatively) occurs at the viscosity level of about 100 cP (at the shear rate of 100 s$^{-1}$ under the downhole conditions). The cross-linked gel has a viscosity of above 100 cP. The low-viscosity fluid has a viscosity in the range of 1 to 100 cP. The low-viscosity fluid may contain various fluids, e.g. water, water with a polymer to reduce viscosity, emulsions, oils, and other fluids that have effective viscosity values in the range of 0.3 to 100 cP at the shear rate of 100 s$^{-1}$ and the temperature of 25° C. In some uses, the low-viscosity fluid may be a high-viscosity fluid, e.g. a fluid based on high-viscosity surfactants, a polymer-containing fluid, a foamed fluid, an acid, or another polymer or surfactant-based fluid, with the effective viscosity being in the range of 10 to 10,000 cP at the shear rate of 100 s$^{-1}$ under downhole conditions. The injection of the low-viscosity fluid includes the injection of a friction-reducing aqueous polymer solution or a linear gel with the viscosity of less than 10 cP at the shear rate of 100 s$^{-1}$ under downhole conditions. The injection of the low-viscosity fluid may imply the injection of the friction-reducing aqueous polymer solution or the linear gel with the viscosity of less than 100 cP at the shear rate of 100 s$^{-1}$ under downhole conditions.

Moreover, at least one specific parameter of the low-viscosity fluid is adjusted to reduce the degradation of the low-viscosity proppant agglomerates into the smaller pulses of the gelled fluid. For example, the pH level of the low-viscosity fluid and/or the concentration of cross-linking ions in the low-viscosity fluid can be controlled.

The low-viscosity fluid ensures low friction during the hydraulic fracturing procedure. Low friction of the low-viscosity fluid results in a reduced power of the pumps for injecting the product into the well compared to the conventional treatment based on the cross-linked gel.

The low-viscosity fluid may contain a surfactant, which facilitates foaming to improve the transportation and to reduce the settling rate of the proppant agglomerates. In addition, the settling rate of the proppant agglomerates slows down because of gas bubbles rising in the low-viscosity fluid. The foaming agents improve the gas dispersion in the low-viscosity fluid and reduce the size of bubbles thereby improving the foam efficiency. Anionic surfactant, cationic surfactant, zwitter-ionic surfactant, non-ionic surfactant can serve as suitable foaming agents.

The low-viscosity fluid may also contain additional additives, such as balls, hollow spheres, degradable fibres, or other materials that improve the transport of the proppant agglomerates and slow down their settling under static conditions after the work is completed.

For example, fibres can be made of polylactic acid, nylon, polyglycolic acid, polyethylene terephthalate, or any other material degradable under the well P-T conditions. Fibres being used may be of any form, e.g. straight, curved, or crimped. Moreover, fibres may have a special coating that improves their dispersion in the clean fluid. Fibres may be added in any concentration within the range of about 0.6 g/L to about 18.0 g/L. Fibres being used may have any structure, for example, "an islet in the sea", "side by side", "core and shell", "zonal", composite or any other structure or combinations thereof. Fibres may have an aspect ratio of about 1:1 to about 1:1,000,000 in any direction. Fibres being used may be contracting, expanding, partially contracting, or partially expanding.

Any high-viscosity hydraulic fracturing fluid may be chosen as the proppant fluid, including a cross-linked gel, a high-viscosity fluid, a polyelectrolyte complex, or a fluid with the elastic limit. The proppant content in the proppant fluid is within the range of 0 to 3,600 g/L. The proppant fluid binds proppant particles together, which effectively enlarges their hydrodynamic radius and reduces their total specific weight, which results in the rational proppant placement as deep as possible into the fracture.

Any propping material (propping agent) can be used as a proppant, e.g., sand, including sand of any standard or non-standard sizes, ceramic proppant, coated proppant, or low-grade sand.

A proppant fluid can be, for example, cross-linked guar gum, carboxymethyl guar, carboxymethyl hydroxypropyl guar (CMHPG), cellulose and its derivatives, xanthan and its derivatives, and other natural, artificial or modified polysaccharides, or other polymers or combinations thereof.

The proppant fluid can be cross-linked by ions, e.g. ions based on $B^{3+}$, $Ti^{4+}$, $Zr^{4+}$, $Al^{3+}$, or a combination of the above cross-linking ions. If the proppant fluid is a guar-based gel cross-linked by boron-based ions, the low-viscosity fluid contains agents that prevent the diffusion of the cross-linking ions from the proppant fluid to the low-viscosity fluid (see Example 9). Moreover, the presence of agents preventing diffusion is obligatory to ensure the stability of a guar gel cross-linked by borate ions at high temperatures. We have demonstrated that the approach provided in the disclosure does not work without these agents that prevent diffusion of borate ions. Agents preventing diffusion can be chosen, e.g. from borate ions, precursors of borate ions, polyborates, or oligoborates.

Some chemical agents can be used to accelerate/slow down the cross-linking process. Such pH regulators as acids, alkalis, buffer solutions can be used for this purpose. Cross-linking inhibitors, such as sorbitol, can also be used for this purpose. A cross-linking agent can be added on both the low-pressure side and the high-pressure side.

FIG. 1 shows the embodiment of the injection system using two fluids and gas injection into both fluids, wherein the system consists of a well 1 that leads to a subterranean formation 2. The well 1 may comprise a vertical well and/or an inclined well, e.g. a horizontal well. In the example, the well 1 treatment injection system is employed to inject a gel 11, e.g. a cross-linked gel, and to inject a low-viscosity fluid 12, e.g. in the form of a friction-reducing aqueous polymer solution, into the well 1 using high-pressure pumps 5, e.g. high-pressure hydraulic fracture pumps. In some uses, the gel 11 and the low-viscosity fluid 12 are mixed together before injecting into the well 1. The arrows provisionally show the gas being injected into the line with the low-viscosity fluid 12 and the line with the gel 11. In some uses, the gas is injected upstream of the junction point of the gel 11 and the low-viscosity fluid 12, as schematically shown in FIG. 1.

Figure 2:
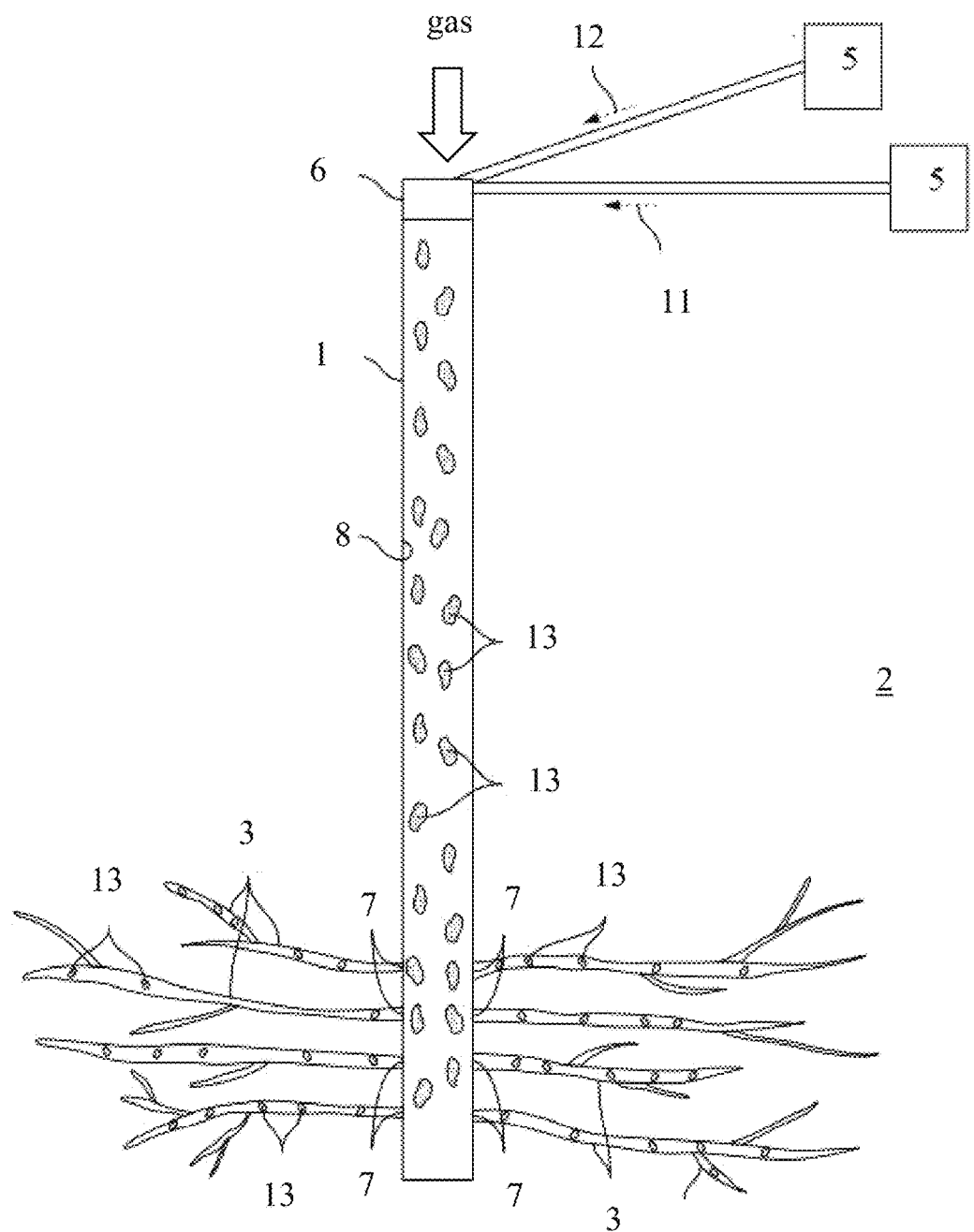
FIG. 2 shows schematically the system of well stimulation treatment according to the embodiment: injection into the well of the low-viscosity fluid, the proppant-bearing cross-linked gel, and gas into the mixture of the low-viscosity fluid and the cross-linked gel downstream of or at the flow junction point.

In some uses, the gas is injected at or downstream of (close to) the mixing (junction) point of the flows of the proppant-bearing gel 11 and the low-viscosity fluid 12, as schematically shown in FIG. 2.

The amount of the injected gas is chosen depending on the pressure and the temperature of the well conditions and the gas solubility in the low-viscosity fluid or in the proppant-bearing cross-linked gel.

The amount of the injected gas is chosen depending on the gas density under downhole conditions, the gas solubility in the carrier fluid, and the operating capabilities. The amount of the injected gas ensures the presence of gas bubbles in the specified fluids 11 and 12. It should be taken into account, however, that the gas solubilities under the laboratory conditions and under downhole conditions (pressure and temperature) may differ. Therefore, nitrogen is used, which has a lower solubility in the water-based hydraulic fracturing fluids than, for example, carbon dioxide, which has a high solubility. Additionally, surfactants (including foam stabilisers) are added to one or both fluids 11 and 12 to increase the stability of gas bubbles. Thus, a surfactant in the appointed concentration (to be checked by the foam stability evaluation technique) is added to the same fluid, where the gas is injected. For example, in the embodiment where the gas is injected into the low-viscosity fluid 12 and the cross-linked gel 11, the sufficient amount of the surfactant is added to each of the fluids to stabilise bubbles. The selection of the surfactant to perform hydraulic fracturing using two rheological different fluids is available to one of ordinary skill in oil production. It can be an anionic surfactant (sodium dodecyl sulphate, or polyacrylamides, or their copolymers, etc.), cationic surfactants (any surfactants based on quaternary ammonium salts or their derivatives, polyacrylamide salts), zwitterionic surfactants (cocamidopropyl betaine, etc.), or neutrally-charged surfactants.

The well 1 treatment injection system divides the gel 11 into the pulses (proppant agglomerates) 13, which are injected together with the low-viscosity fluid 12 under pressure into the fractures 3 leading to the subterranean formation 2. The properties of the injected gel 11 are different from those of the low-viscosity fluid 12, and the gel 11 is immiscible with the low-viscosity fluid 12 during a certain period of time, for example, due to the cross-linked polymeric structure, differences in the fluid viscosity, hydrophobic/hydrophilic properties, emulsion formation, flow stress and/or other properties. Due to the use of the combination of the gel pulses 13, the low-viscosity fluid 12 and the injected gas distributed in the gel pulses 13 and the low-viscosity fluid 12, the pulses 13 are distributed deep in the fractures 3, including secondary and tertiary fractures. The gel pulses 13 may be used to form proppant structures across the space (height) of the fracture, thereby helping to keep the fracture open. The pulses 13 form separate propping elements from the proppant (while in turn forming open channels between each other), which keep the fractures 3 open while increasing the hydrodynamic conductivity of the latter when the fluid is produced. The gel flow 11 can be divided into the relatively small pulses 13 under shear stress, when the gel flow 11 passes through perforations 7 provided in the casing 8 of the well 1. For example, the larger pulses 13 are broken into the small pulses 13 in the perforations 7. Nevertheless, different methods can be used to divide the gel flow into the pulses at the section downstream of the high-pressure fracture pumps 5. For example, a device 6 can be installed on the path of the gel 11, for example, a valve, which will operate regularly to create the pulses 13. In some uses, a cross-linking additive is added regularly to the gel flow 11 to create the separate pulses 13 consisting of a cross-linked gel. For example, a cross-linking agent can be added regularly to the gel 11 through the device 6 (valve) to create the separate pulses 13 in the injected fluid.

Figure 3:
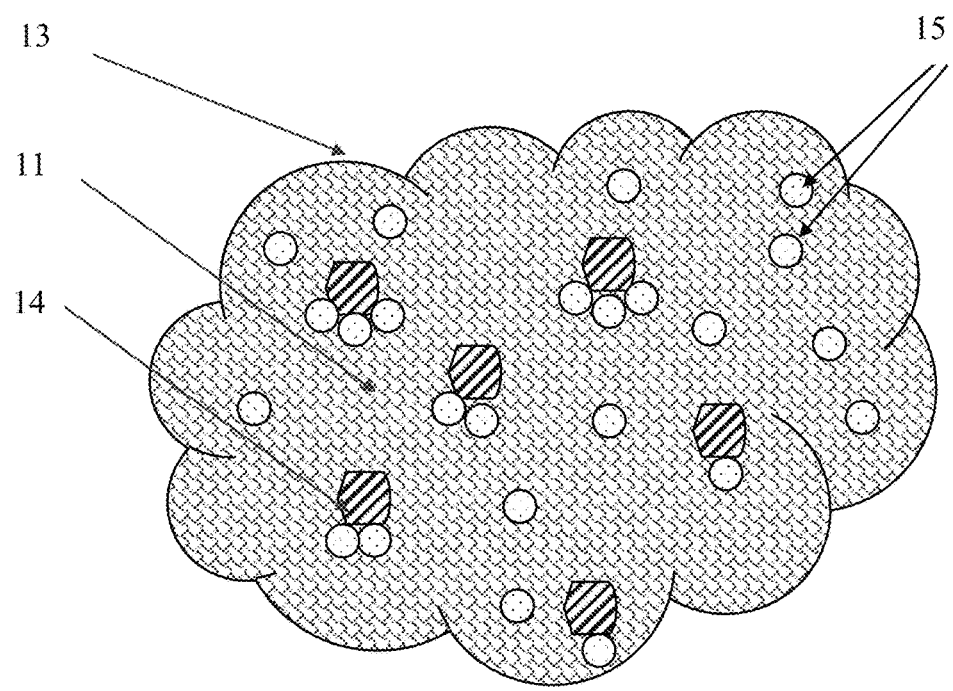
FIG. 3 shows schematically a slug based on the cross-linked gel containing the proppant particles and gas bubbles.

As illustrated in FIG. 3, the proppant fluid is used to create the individual pulses. In this example, the pulse (proppant agglomerate) 13 is formed of the proppant fluid 11 based on the cross-linked gel and comprises proppant dispersion 14 and gas bubbles 15, so that the pulses 13 are buoyant (have low specific density) in the low-viscosity fluid 12, which in turn can comprise gas bubbles 15. In this example, the formation of the proppant agglomerates 13 was observed in an experimental slot that simulated a narrow hydraulic fracture. The proppant agglomerates 13 with gas bubbles showed a low settling rate and uniform distribution of the proppant "islets" along the vertical dimension of the fracture. If proper measures are taken, the proppant agglomerates 13 remain intact even with high hydrodynamic loads on the fluids and at high pressures and temperatures. In the context of this disclosure, the stability of the agglomerate means that when it is transferred into the fracture by the hydraulic fracturing flow, the main agglomerate components will be preserved, in this case, the cross-linked ("thickened") gel, the proppant, and the injected gas bubbles. Such stability is reflected in the constant specific weight of the proppant agglomerate ("pulse").

In FIG. 3, the buoyant and partially buoyant pulses (proppant agglomerates) 13 may have a specific density in the range of about 0.50 g/cm$^3$ to about 1.50 g/cm$^3$ and can be created by including the proppant 14, in some uses mixed with an additive that increases buoyancy, into the crossed-linked gel 11.

At least in several uses, the specific density of the proppant agglomerates 13 may be lower than the specific density of the proppant. The additive that controls the buoyancy of the agglomerates 13 may contain various materials that have a specific density lower than the specific density of the proppant 14, for example, at the pressure above one atmosphere and the temperature above 0° C. For example, the buoyancy-controlling additive may contain a fluid immiscible or partially miscible with water, including oil (natural oil, diesel oil, vegetable oil, palm oil), petrol, organic solvents (benzene, toluene), and other suitable fluids, including mixtures of fluids. Furthermore, such additive may be in the form of solid particles, for example, hollow glass or ceramic spheres or other particles, hollow fibres, wood pieces, porous particles (fly ash, plastic foams, porous coal, carbon black, artificial porous particles and other suitable particles), or a fluid immiscible or partially miscible with water, including oil (for example, natural oil, diesel oil, vegetable oil, palm oil), petrol, organic solvents (for example, benzene, toluene), and other suitable fluids, including mixtures of fluids, in pores, and/or clathrate compounds (gas hydrates). Moreover, these types of buoyancy-increasing additives may be used simultaneously and/or in various combinations. In some uses, the proppant fluid 11 used to create the agglomerates 13 may lack the additive controlling the agglomerates 13 buoyancy, if, for example, the cross-linked gel 11 provides enough buoyancy.

In some uses, the gas is injected into the cross-linked gel that is injected in the form of a partially or fully cross-linked gel. The cross-linked gel is assumed to absorb the gas before the state of cross-linking is reached, and after that it holds gas firmly inside a cross-linked matrix (see Example 1). This disclosure demonstrates that the cross-linked gel can absorb the gas even when the state of cross-linking is reached, which is uncommon (see Example 4).

Under the conditions inside the well (high pressure and temperature) will be large amounts of gas for obtain buoyant proppant agglomerates. But even if the gas contact time is short, the gel containing 240 g/L of proppant can absorb a sufficient amount of gas to become buoyant (see Example 4). In the field, the time of contact of the cross-linked gel with the gas can be longer, that is why the longer contact time in the field helps reduce the specific weight of proppant agglomerates containing more than 240 g/L of the proppant to the desired level.

Under shear loads of the flows of the proppant-bearing cross-linked gel and the low-viscosity fluid, the gas losses from the agglomerates are less than 80% of the initial amount of gas, and the proppant losses are less than 50% of the initial amount of the proppant (see Example 5). Even at high shear rates (of the low-viscosity fluid flow), a certain amount of the contained gas (at least 30%) remains in the agglomerates with small losses of sand. The remaining gas can still make up for the weight of the remaining sand and reduce it to the acceptable level for transporting the proppant agglomerates. In the field, a certain additional amount of gas is added to the "dirty" fluid so as to compensate for the losses of gas in the perforations.

A surfactant or a combination of surfactants is added to the cross-linked gel to hold the gas inside. The cross-linking fluid can contain a surfactant that improves the gas dispersion in the cross-linking fluid and enhances the foam stability in the cross-linking fluid.

The cross-linking fluid can contain 0 g/L to 18 g/L of degradable fibres, which enhances the mechanical stability of the proppant agglomerates.

Adding gas to the "dirty" fluid, as well as adding fibres to the "clean" fluid can result in preventing the aggregates from settling under dynamic conditions (see Examples 6, 8), improving transport of the agglomerates (see Examples 6, 8), preventing the aggregates from settling under static conditions (see Example 6), and in the formation of islet structures, as shown in Example 6.

In the field, the scheme of two simultaneous converging flows can be used to inject the product into the well, with the flow rates ratio of 5:95 to 95:5. The total injection rate may vary from 5 to 200 barrels per minute (0.8-32 m³/min). The sequence of injecting the proppant-bearing cross-linked gel into the wellbore and injecting the low-viscosity fluid into the wellbore, as well as the sequence of injecting gas into the low-viscosity fluid and/or the proppant-bearing cross-linked gel, and separating the proppant-bearing cross-linked gel into the agglomerates, may vary in case gas is injected upstream of the junction point of the fluid flows or downstream of that point. The dirty line can join the clean line upstream of or at the wellhead.

The same result can be achieved when the "clean" fluid and the "dirty" fluid are injected simultaneously via different routes, for example, when one of the fluids ("clean" or "dirty") is injected through the annulus space, and the other through the wellhead.

The gas can be added to the hydraulic fracturing fluid (to the "clean" fluid, "dirty" fluid, or both fluids) inside the well. The gas can be delivered inside the well through a separate pipe, through the annulus space, and added to the fluids inside the well. The "dirty" fluid can capture the gas even in the state of partial or even complete cross-linking.

The gas can be produced inside the "dirty" fluid as a result of a chemical reaction or another process initiated by time, by a change in the pressure, by shear, or by temperature. For example, the cross-linking fluid can contain components that react with other components to release the gas. The reaction can be intensive enough to release enough gas before the agglomerate reaches the perforation.

The gas can be produced inside the "clean" fluid as a result of a chemical reaction or another process initiated by time, by a change in the pressure, by shear, or by temperature. For example, the cross-linking fluid can contain components that react with other components or components of the annulus/casing/formation to release the gas. The reaction can be intensive enough to release enough gas before the agglomerate reaches the perforation.

The following non-limiting examples provide various testing procedures performed with various fluids and additives.

The non-metric unit of measure "gpt" means 1 gallon of an additive per 1 thousand gallons of fluid.

The measurement unit of "ppt" means the concentration in pounds added per 1 thousand gallons of fluid.

The measurement unit of "PPA" means the concentration of the proppant (in pounds) added per gallon of the clean fluid.

EXAMPLES

Example 1. Preparing Gas-Bearing Agglomerates

The agglomerates were produced as follows:
1. A linear gel with 3 g/L of guar gum was prepared.
2. 480 g/L of sand was added while stirring vigorously.
3. Nitrogen gas was purged through the proppant suspension in the linear gel (viscous fluid) for 20 to 30 seconds (the delivery rate is ~10 L/min) while constantly stirring the suspension.
4. The standard amount of the cross-linking agent based on the borate ion (boric acid) was then added.

It was found at the end of the experiment that the specific weight of the produced proppant agglomerate was 0.89. When the proppant agglomerate (containing sand and gas bubbles in a cross-linked gel matrix) was placed in a vessel with the low-viscosity fluid (water with 0.5% polyacrylamide, PAA), the produced light proppant agglomerate preserved its buoyancy and integrity (did not fall apart or lose sand from its volume).

Example 2. Preparing Proppant Agglomerates with the Specific Density Below that of Proppant Particles The agglomerates were produced as follows:

1. A linear gel with 3 g/L of guar gum was prepared.
2. 960 g of sand per 1 L of the linear gel was added while stirring vigorously.
3. The standard amount of the cross-linking agent based on the borate ion (boric acid) was then added, with sand particles being included in the support matrix of the cross-linked gel.

It was found at the end of the experiment that the specific weight of the produced proppant agglomerate (cross-linked gel capturing sand and gas bubbles) was 1.45. Such specific density is lower than that of sand particles (~2.65), which allows increasing the proppant transportability and reducing its settling rate.

Example 3. Stability of Proppant Agglomerates with the Reduced Specific Density Due to Gas Bubbles Injected in the Cross-Linked Gel and Low-Viscosity Fluid The gas was injected into both fluids simultaneously: the cross-linked gel and the low-viscosity fluid.

The proppant agglomerates were prepared as in Example 1, but air was additionally injected into the low-viscosity fluid (0.5 mL/L of polyacrylamide) for 20 to 30 seconds. It was found at the end of the experiment that the agglomerates (with sand and gas) preserved their integrity and buoyancy in the foamed (with gas) low-viscosity fluid.

Example 4. Ability of the Fully Cross-Linked Gel to Absorb Gas

The buoyant proppant agglomerates were prepared in the following sequence.

Preparing a linear gel (guar gum with the concentration of 1.5 g/L).

Adding sand while stirring (40/60 mesh Badger sand with the concentration of 0 to 3 PPA).

Adding the foam stabilizer (surfactant).

Adding the cross-linking agent (50 mL/L of 2% boric acid solution) and the alkaline agent (3 mL/L of 5% NaOH solution) and waiting for the gel to reach the state of complete cross-linking.

Adding the gas (nitrogen) to the suspension prepared while stirring.

The foam stabilizer was added as a surfactant in concentrations of 1.0 mL/L and 2.5 mL/L. An increase in the surfactant concentration increases the gas (nitrogen) amount in the viscous agglomerate and thereby improves the stability of gas bubbles in the suspension. Columns (2)-(4) of Table 1 show the increase in the concentration of gas bubbles, which leads to reduction in the final specific weight of the agglomerate (gas compensates partially for the increased agglomerate density caused by the addition of heavy sand). The proppant agglomerates with the cross-linked gel obtained using a cross-linking agent based on the boron cation $B^{3+}$ were studied. The results of the experiments (specific weight) are shown in Table 1.

TABLE 1

| Proppant concentration in PPA units (1 PPA = 120 g per 1 L of fluid) | Specific weight of agglomerates based on cross-linked gel, g/cm³ | | |
|---|---|---|---|
| | 1.0 mL/L of surfactant (without nitrogen) | 1.0 mL/L of surfactant + nitrogen | 2.5 mL/L of surfactant + nitrogen |
| 0 | 1.01 | 0.93 | 0.92 |
| 1 | 1.08 | 1.06 | 0.97 |
| 2 | 1.14 | 1.10 | 0.98 |
| 3 | 1.21 | 1.14 | 1.10 |
| 4 | 1.26 | 1.16 | 1.13 |
| 5 | 1.31 | 1.23 | 1.20 |

The obtained results demonstrated that a gas may be injected into a gel that have reached the state of complete cross-linking (cross-linked gel).

Figure 5:
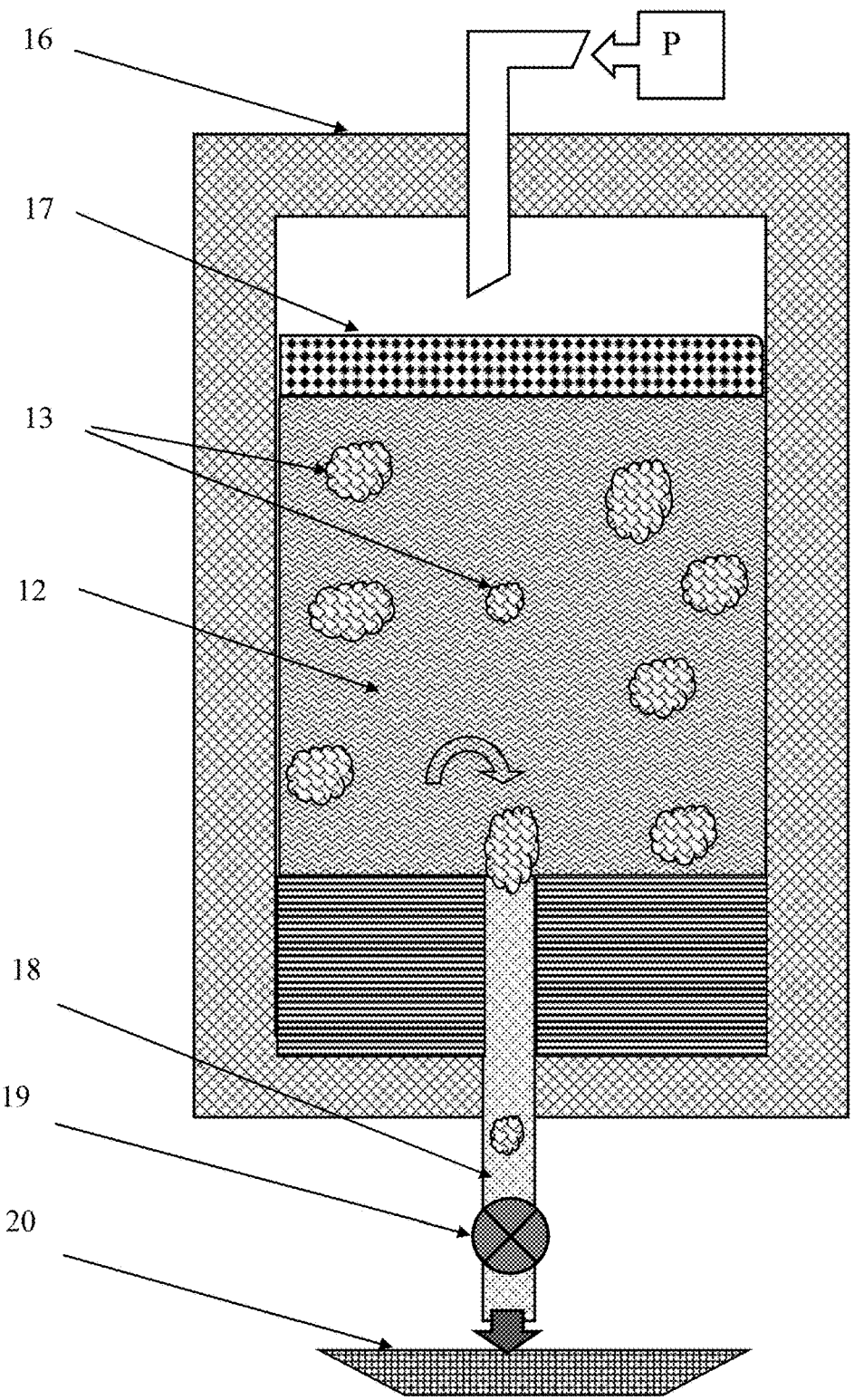
FIG. 5 is a schematic view of the experimental cell used for measuring ability of agglomerates to hold proppant after application of shear resistance of Example 4.

Example 5. The Ability of the Cross-Linked Gel to Hold Gas Under Shear Stress To simulate the behaviour of the slugs as they pass through narrow perforation openings in the casing, experiments were performed using a special cell 16 comprising a cylinder, a piston 17 under pressure P, and a narrow outlet section 18 (a 2 mm wide slit) to create a flow with a high shear rate in the narrow section (FIG. 5). When the slug 13 passed through the narrow channel 18, its dimensions changed, but the total content of the viscous slug (presence of gas bubbles and the proppant) in the original cross-linked gel matrix remained high. This confirms the possibility that sand and gas will be preserved in the viscous gel and that it will pass through the perforation openings during transport of the proppant material into the narrow fracture space.

The experiment was performed as follows.

Filling the volume of the cell 16 with the low-viscosity aqueous fluid 12 and adding 2-6 mL/L of the cross-linking agent for the gelling agent (zirconium salt).

Creating the viscous slugs of the cross-linked gel 13 according to the formulation of Example 1 in the amount of 150-200 mL and placing them into the experimental cell 16 filled with water (cylinder with the piston 17 and the narrow outlet 18). Measuring the initial specific density of the composite slug and the gas content thereof. The width of the opening (slit) at the bottom of the cell was 2 mm, which created high shear stress in the flow when passing through the narrow opening. At the cell outlet there is an outlet valve 19, and the outgoing fluid falls in an open container 20 for further analysis (specific weight measurement).

Increasing the pressure P over the piston to 0.7-2.0 bar with the outlet valve 19 closed. Opening the outlet valve 19 at the bottom of the cell to drive the fluid in the cell and catching the outgoing slugs 13 in the container 20. The shear stress in the viscous fluid slug can be assessed by the calculated velocity of the outlet fluid and the size of the outlet (the slit width).

Measuring the amount of sand lost from the viscous slug 13 with a high short-time shear stress of the flow. Then estimating the specific weight of the slug at the outlet and calculating the gas loss and the proppant (20/40 mesh sand) loss. The results of the stability tests for the viscous slugs based on the cross-linked guar gel are shown in Table 2.

TABLE 2

| Outlet slit area, cm² | P, bar | V, m/s | Shear stress $\gamma$, s⁻¹ | Specific weight of the sand agglomerate | | Gas content | | Gas loss, % | Sand loss, % |
|---|---|---|---|---|---|---|---|---|---|
| | | | | before shear stress | after shear stress | before shear stress | after shear stress | vol. of initial amount | vol. of initial amount |
| 0.3 | 0.7 | 87 | 109,000 | 0.86 | 1.08 | 0.29 | 0.106 | 70 | 6.2 |
| | 2.0 | 260 | 328,000 | 0.86 | 1.09 | 0.29 | 0.099 | 72 | 6.9 |

As can be seen from the results of experiments shown in Table 2, the gas loss from the viscous agglomerates after passing through the perforation openings was 70% of the initial amount of gas. This resulted in the reduced share of gas contained in the agglomerate and a minor increase in the specific weight of the mixture. The major portion of sand remained inside the proppant agglomerates, because only 6-7% of the initial amount of sand fell out from the agglomerate because of the short-time shear stress. It is expedient to add an additional amount of gas to the agglomerates so as to make up for the losses of gas by the agglomerates in the perforations.

Example 6. Transporting Gas-Bearing Agglomerates Through the Narrow Fractures Agglomerates Settling Transporting the gas-bearing proppant agglomerates by the low-viscosity fluid (aqueous polyacrylamide solution) and agglomerates settling under static conditions were tested in a unit that simulates the flow of fluid in a fracture. The agglomerate composition is close to that of Example 1. The width of the fracture (vertically oriented slit-like channel) was 2 mm, the length was 3 m. An insert with 8 perforations was placed at the fracture inlet, with each perforation diameter of 4 mm.

When the fluid was injected into the unit (simulator of the flow in the fracture), the flow was stopped and the behaviour of the agglomerates under static conditions was observed. The results of the experiment showed the impact of the gas on the agglomerates settling. The gas contained within the gel reduced the agglomerate settling noticeably. In the experiments with gas, it was noticed that when gas bubbles separated from the agglomerates and rose upwards, they were caught by the agglomerates located higher. So gas "cushions" formed under these agglomerates that prevented the agglomerates from further settling.

Figure 4:
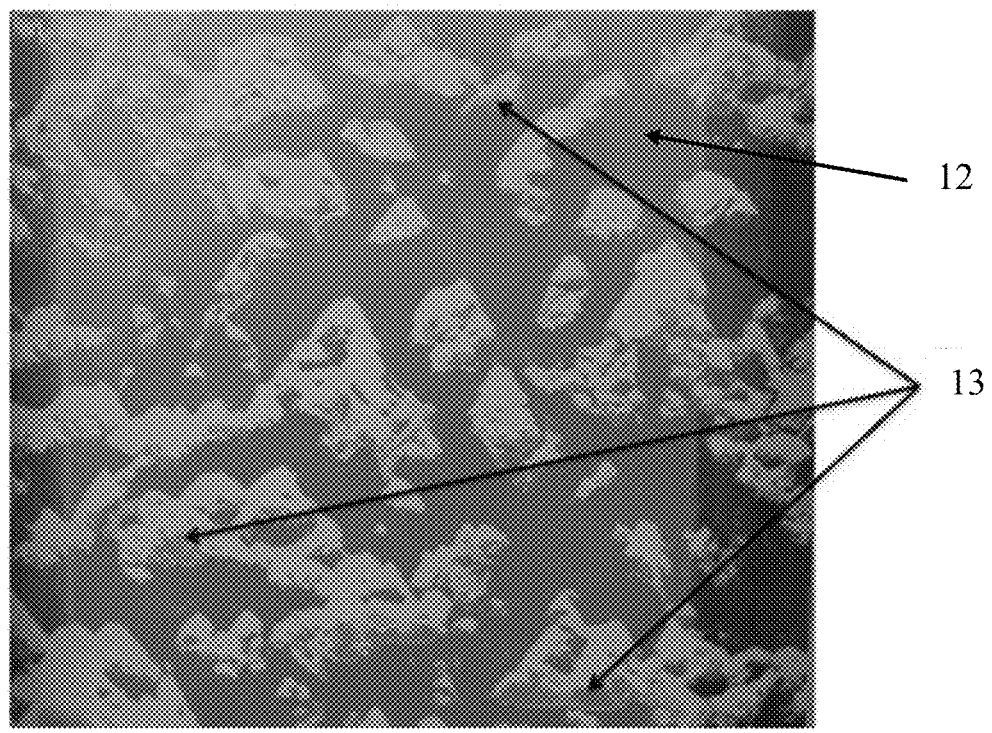
FIG. 4 shows a photo of the experimental cell, wherein the slugs of FIG. 3 are distributed within the volume of the low-viscosity fluid.

FIG. 4 shows a photo of the arrangement of the viscous proppant agglomerates in the low-viscosity fluid. It can be seen that the agglomerates do not settle and preserve their integrity (size and composition) for a long time. When the fracture walls close, such compact agglomerates create proppant islets between the hydraulic fracture walls.

Example 7. Transporting the Gas-Bearing Agglomerates by the Low-Viscosity Hydraulic Fracturing Fluid and Delayed Settling of These Gas-Bearing Agglomerates Compared to the Agglomerates Without Gas Movement and settling of the proppant agglomerates (under static conditions) was studied in a test unit that simulates the flow of fluids in a vertical hydraulic fracture. The width of the vertically oriented slit-like channel was 2 mm, the channel length was 3 m. There was an inlet insert with 8 perforation openings (4 mm in diameter) at the channel inlet. Water containing a friction-reducing polymer (0.5 mL/L polyacrylamide), fibres made of polylactic acid (PLA) polymer with the concentration of 12 ppt, and $B^{4+}$-based cross-linking agent with the concentration of 2 mL/L were fed via the line 1 (low-viscosity fluid) to the channel inlet.

The following mixture was fed via the line 2 (proppant fluid) using a pump: water thickened with a polysaccharide (25 ppt guar gum), which was preliminarily cross-linked by the cross-linking agent $H_3BO_3$ (2% water solution) with the concentration of 13.5 mL/L, and the gel cross-linking occurred at an alkaline pH due to the addition of KOH solution (2.4 mL/L of 5% solution). 40/70 mesh Badger sand with the concentration of 8 PPA was added to the cross-linked gel. The obtained sand suspension in the cross-linked gel was thoroughly stirred.

The proportion of feeding the fluids via line 2 and line 1 was 30/70% (excessive amount of the low-viscosity fluid). The velocity of the total flow in the slit-like channel was approximately 0.3 m/s, which is close to the speed of the hydraulic fracturing fluid injection into the subterranean formation.

When the said two fluids were injected into the narrow vertical channel through a group of perforation openings, the proppant agglomerates were formed and further transported throughout the volume of the long slit-like channel by the low-viscosity fluid (line 1).

In the first experiment, the gas was not injected into line 2 ("heavy" agglomerates in the low-viscosity fluid at the channel inlet). In the second experiment, nitrogen gas was injected in line 2, which resulted in the reduced specific weight of the agglomerates ("light" agglomerates in the low-viscosity fluid).

In the case of the gas-bearing viscous agglomerates (experiment 2), the tests showed a better transfer of the "light" agglomerates, which reached the end of the 3-meter slit-like channel. This was achieved by reducing the specific weight of the agglomerates (neutral buoyancy). The specific weights of the light and heavy agglomerates were measured in the first and second experiments, as shown in Table 3.

The results of the experiments showed that due to the presence of gas bubbles the agglomerates can be transported far by the low-viscosity fluid inside narrow (2 mm) fractures. Even after waiting for 3 hours, most of the agglomerates did not settle at the bottom of the channel. The results are shown in Table 3.

TABLE 3

| Test No. | Total flow velocity, m/s | Proportions of the fluid flow rate from the second line/first line | Gas addition to the first line | Specific weight of the proppant agglomerate in the slit-like channel | Longitudinal proppant transfer in the slit-like channel |
|---|---|---|---|---|---|
| 1 | 0.3 | 30/70 | 0% | 1.45 | Moderate |
| 2 | 0.3 | 30/70 | 50% vol. (N₂) | 1.10 | Good |

Example 8. Transporting the Gas-Bearing Agglomerates into a Highly Branched Network of Fractures and Within the Network Transport of the agglomerates within the fractures, their ability to negotiate angles when moving, for example, from the primary fracture to the secondary fracture, etc., were tested experimentally. This was tested using a unit that simulates such flows. The experiments were conducted using two simultaneous converging flows. The experimental parameters are shown in Table 4. The experiments were conducted with the 8 ppa agglomerates, with and without nitrogen.

TABLE 4

| | dirty | | Clean line | | | Dirty line | | |
|---|---|---|---|---|---|---|---|---|
| Σ flow velocity, cm/s (in 2 mm section) | line/clean line, flow velocities ratio | Friction-reducing agent (mL/L) | Fibres (ppt) | Stabilizer (mL/L) | Guar (ppt) | Sand (ppa) | Cross-linking agent - boric acid (mL/L) | Activator/ sodium hydroxide (mL/L) | Additive for reducing specific weight, % |
| 30 | 30/70 | 0.5 | 12 | 2 | 25 | 8 | (2% wt) 13.4 | (5% wt) 2.4 | N₂ 40% vol. |

The obtained results suggest that the gas-bearing agglomerates propelled by the low-viscosity fluid can penetrate secondary, tertiary, etc. fractures, even if they are located at an angle at the flow velocities typical of these fractures, even when the agglomerates contain high concentration of the proppant (up to 8 ppa).

Example 9. Stability of the Gas-Bearing Agglomerates at High Fluid Temperatures Several experiments were carried out to study the ability of the cross-linked gels to hold sand at high temperatures. The cross-linked phase of the gel in the agglomerates is shown to be much more stable when the diffusion-controlling agent (the gel cross-linking agent or precursor) is added to the clean fluid portion.

The agglomerates containing the cross-linked gel, sand, and gas were placed in a beaker with tap water. The beakers were placed in an oven at the temperature of 95° C. The behaviour of the agglomerates was observed for 1 hour. First, the agglomerates with the cross-linking agent based on the borate ion were tested. In the left beaker, the low-viscosity fluid contained the diffusion-controlling agents, in the right beaker, the clean fluid did not contain any diffusion-controlling agent.

From the results of the experiments we have seen the meaning of having diffusion-controlling agents in the low-viscosity fluid for transport pattern. Otherwise, the agglomerates lose their buoyancy very quickly. When the low-viscosity fluid contains the diffusion-controlling agents, the agglomerates remain stable for approximately one hour at 95° C.

Example 10. Stability of the Agglomerates Containing the Gel Cross-Linked by Boron Ions in the Low-Viscosity Fluid with the $Zr^{4+}$ Ion-Based Cross-Linking Agent The addition of the $Zr^{4+}$ ion-based cross-linking agent to the low-viscosity fluid and the behaviour of the gel cross-linked by boron ions in that fluid were tested experimentally.

The gel cross-linked by boron ions comprises: 300 mL of 35 ppt guar, 52.8 mL/L of 2% wt boric acid solution, and 2.8 mL/L of 5% wt NaOH solution.

The low-viscosity fluid comprises: 700 mL of tap water, 10.7 mL/L of the double ($B^{3+}$ and $Zr^{4+}$) cross-linking agent, and 5 ppt NaOH.

The gel was observed after 4 hours at 95° C., which was not dissolved in the low-viscosity fluid solution. The agglomerate of the cross-linked gel floated on the mixture surface. Similar experiments were conducted with the gel agglomerates containing sand and gas. The following parameters were used. The low-viscosity fluid composition: 525 mL of tap water, double cross-linking agent containing both borate ions and zirconate ions 7.5 mL (10 mL/L of all the fluid), 0.6 g/L of NaOH (all the fluid).

The gel agglomerate composition: 225 mL of guar gel with the guar concentration of 35 ppt, 2 mL/L of surfactant foaming agent, 600 g/L of 50/140 sand, 52.8 mL/L of 2% wt boric acid solution, and 2.8 mL/L of 5% wt NaOH solution. The agglomerate also contained a certain amount of nitrogen sufficient to make the agglomerate buoyant.

The experiment was conducted at 95° C.

The result of the experiment demonstrated the agglomerates stability.

Buoyant or partially buoyant proppant agglomerates may be used for many types of hydraulic fracturing operations, including hydraulic fracturing, fracturing and packing operations, and other hydraulic fracturing operations. The methodology may also be employed in many types of subterranean formations, including sandstone, shale, carbonate, and/or other types of subterranean formations. The method can be used for various types of wells, including inclined (e.g. horizontal) and vertical wells in various productive reservoirs, for example, reservoirs of oil and gas, wet gas, coal bed methane, gas condensate.

Although a few embodiments of the disclosure have been described in detail above, those of ordinary skill in the art will readily appreciate that many modifications are possible without materially departing from the spirit and scope of this disclosure. Accordingly, such modifications should be included in the scope of the disclosure as defined in the claims.

The invention claimed is:

1. A method of treating a well, comprising: a) injecting a cross-linked gel containing a proppant into a wellbore extending into a subterranean formation; b) injecting a low-viscosity fluid into the wellbore that has a viscosity lower than 10 cP at a shear rate of 100 s$^{-1}$ under downhole conditions; c) injecting gas into the low-viscosity fluid and/or the proppant-bearing cross-linked gel; d) separating the proppant-bearing cross-linked gel into agglomerates suspended in the low-viscosity fluid; and e) transporting the low-viscosity fluid containing the agglomerates to fractures formed in the subterranean formation, thereby allowing the agglomerates to form proppant structures in the fractures.

2. The method of claim 1, wherein the agglomerates have a specific density in a range of about 0.50 g/cm$^3$ to about 1.50 g/cm$^3$.

3. The method of claim 1, wherein at stage c) the gas is injected into a partially or fully cross-linked gel.

4. The method of claim 1, wherein, under shear stress arising from flow of proppant-bearing cross-linked gel and low-viscosity fluid, gas losses from the agglomerates are less than 80%, and proppant losses are less than 50%.

5. The method of claim 1, wherein the injected gas is selected from the group consisting of nitrogen, air, natural gas, carbon dioxide, methane, ethane, propane, inert gases, or any blend thereof.

6. The method of claim 1, wherein at stage c) the gas is injected upstream of a junction point, at the junction point, or downstream of the junction point of the flows of the low-viscosity fluid and the proppant-bearing cross-linked gel.

7. The method of claim 1, wherein the proppant-bearing cross-linked gel is divided into the agglomerates within the well, in perforations, in the fracture or a combination thereof.

8. The method of claim 1, wherein the proppant-bearing cross-linked gel is divided into the agglomerates upstream of a wellhead.

9. The method of claim 1, wherein at stage d) the proppant and gas-bearing cross-linked gel is divided into separate agglomerates.

10. The method of claim 1, wherein at least one parameter of the low-viscosity fluid is adjusted to maintain agglomerate stability.

11. The method of claim 10, wherein the adjustment includes the adjustment of pH of the low-viscosity fluid.

12. The method of claim 10, wherein the adjustment includes the adjustment of a concentration of at least one type of cross-linking ions in the low-viscosity fluid.

13. The method of claim 1, wherein the injection of the low-viscosity fluid includes injection of a friction-reducing aqueous polymer solution or a linear gel.

14. The method of claim 1, wherein the cross-linked gel with a viscosity of at least 100 cP at a shear rate of 100 s$^{-1}$ under downhole conditions is injected.

15. The method of claim 1, wherein the cross-linked gel is based on guar or its derivatives, hydroxypropyl guar, or carboxymethyl hydroxypropyl guar, cross-linked with a reagent containing at least one of $B^{3+}$, $Ti^{4+}$, $Zr^{4+}$ ions, and further containing NaOH and/or KOH, buffers or other pH activators.

16. The method of claim 1, wherein a surfactant or a combination of surfactants is added to the cross-linked gel or the low-viscosity fluid.

17. The method of claim 1, wherein the cross-linked gel and the low-viscosity fluid are injected simultaneously via different routes.

18. A method of treating a well comprising: a) injecting a gel fluid containing a proppant into a wellbore extending into a subterranean formation; b) adding a cross-linking additive to the gel fluid regularly to produce agglomerates comprising cross-linked gel; c) injecting a low-viscosity fluid into the wellbore that has a viscosity lower than 10 cP at a shear rate of 100 s$^{-1}$; d) injecting gas into the proppant-bearing gel and/or the low-viscosity fluid; e) injecting the low-viscosity fluid and the agglomerates based on the cross-linked gel into the subterranean formation to form proppant structures.

19. The method of claim 18, wherein stage c) is implemented before stage a).

* * * * *